United States Patent
Simkins

(10) Patent No.: US 7,216,339 B2
(45) Date of Patent: May 8, 2007

(54) SYSTEM AND METHOD OF DETERMINING SOFTWARE MATURITY USING BAYESIAN DESIGN OF EXPERIMENTS

(75) Inventor: David Judson Simkins, Apalachin, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 770 days.

(21) Appl. No.: 10/387,542

(22) Filed: Mar. 14, 2003

(65) Prior Publication Data

US 2004/0193959 A1    Sep. 30, 2004

(51) Int. Cl.
    *G06F 9/44*    (2006.01)
(52) U.S. Cl. ......................... 717/126; 717/124
(58) Field of Classification Search ............... 717/126, 717/124; 714/38
    See application file for complete search history.

(56) References Cited

U.S. PATENT DOCUMENTS

| | | | |
|---|---|---|---|
| 5,133,046 A | | 7/1992 | Kaplan |
| 5,548,718 A | | 8/1996 | Siegel et al. |
| 5,778,169 A | * | 7/1998 | Reinhardt ............... 714/38 |
| 5,808,919 A | | 9/1998 | Preist et al. |
| 6,067,639 A | * | 5/2000 | Rodrigues et al. ........ 714/38 |
| 6,636,585 B2 | * | 10/2003 | Salzberg et al. .......... 379/22 |
| 6,725,399 B1 | * | 4/2004 | Bowman .................. 714/38 |

OTHER PUBLICATIONS

"Software Regression Testing", Hoover, published Jan. 2003 (13 pages). [Online] [Retrieved at] <www.sei.cmu.edu/programs/acquisition-support/conf/2003-presentations/hoover.pdf>.*

"A history-based test prioritization technique for regression testing in resource constrained environments", Kim et al., published May 2002 (11 pages). [Online] [Retrieved at] <http://portal.acm.org/citation.cfm?id=581339.581357>.*

Ziv et al., "Constructing Bayesian-network models of software testing and maintenance uncertainties," *Software Maintenance, IEEE Proceedings*, Oct. 1997, pp. 100-109.

Fenton et al., "Assessing dependability of safety critical systems using diverse evidence," *Software, IEEE Proceedings*, Feb. 1998, vol. 145, Issue 1, pp. 35-39.

Chulani et al., "Bayesian analyisis of empirical software engineering cost models", *SoftwareEngineering, IEEE Transactions*, Jul.-Aug. 1999, vol. 25, Issue 4, pp. 573-583.

* cited by examiner

Primary Examiner—Tuan Dam
Assistant Examiner—Thuy Dao
(74) Attorney, Agent, or Firm—Ronald E. Prass, Jr.; Irving, Prass & Stelacone, LLP.

(57) ABSTRACT

A system and method for determining software maturity, the method comprising the steps of building an uncensored belief distribution from a set of observed test data, building belief distributions based on improvement factors, convoluting the uncensored belief distribution with the belief distribution on improvement factors to form a censored belief distribution. From these belief distributions, a 3-way assessment is made including establishing an a priori belief distribution to assess a level of software maturity.

2 Claims, 3 Drawing Sheets

SYSTEM AND METHOD OF DETERMINING SOFTWARE MATURITY USING BAYESIAN DESIGN OF EXPERIMENTS

Qualifying or certifying software should require formal methods. Such methods are formal fixed length or sequential length tests based on successes/failures of individual tests that reflect how the user will exercises this software. These formal methods are referred to as formal qualification (QUAL) tests in this invention. QUAL tests usually start once the software has successfully undergone nominal, off-nominal, and stressed testing called Test, Analyze And Fix (TAAF). Both TAAF and QUAL testing need to be conducted under well-defined plans and procedures with an-agreed-to test criteria with the user. This criteria describes what constitutes success and failure, what tests should be performed: nominal, off-nominal and stress.

The present inventor has discovered, however, that QUAL tests based on classical statistical test procedures fall short and gives erroneous results. These classical test procedures, fixed length or sequential hypothesis type of tests, are based on well-defined stochastic processes such as Bernoulli or Poisson or their derivatives. The present inventor has determined that software does not behave in any well-defined stochastic fashion; but instead in an ill-defined fashion—more deterministic than stochastic. The user does not exercise software randomly; but generally uses a well-defined repeatable sequence of inputs that, in turn, executes code that has been tested, debugged and retested over and over again to ensure very predictable results. The uncertainty in the behavior of the software is due instead to when the user does something unexpected or if there is a rare combination of inputs that "hits" untested code. This uncertainty cannot be described by well-behaved stochastic processes or their derivatives; but can be described as beliefs or least-wise by subjective probabilities.

The present inventor has determined that beliefs functions, in particular Bayesian Beliefs Networks (BBN), are adequate in addressing both TAAF and QUAL test in terms of how mature the software is. Belief networks are relied on to model uncertainty in a variety of fields ranging from medical diagnosis to software engineering. Belief networks are rooted in probability theory and are based on qualitative expert assumptions about underlying conditions and findings, which make them simple yet powerful models for predicting outcomes of relevant experiments.

This invention illustrates two novel designs of experiments embodiments of Bayes Information Science (BIS) and BBN. These embodiments provide for risk statements concerning the software maturity from both TAAF and QUAL tests. The first embodiment uses BBN to permit the convolution of those subsets of TAAF tests that reflect nominal usage with the QUAL tests, which are typically nominal. For the first embodiment, in accordance with Bayesian mathematics, the BBN incorporates a priori evidence from past test data—as long it reflects nominal use cases—with the most recent test data to form an a posteriori belief distribution. The second embodiment uses both BBN and BIS to formally incorporate not only the TAAF nominal tests, but also incorporates TAAF off-nominal and stress tests as well and finally regression tests used in verifying corrective actions. These designs of experiments do not require a well-behaved, stochastic process.

DETAILED DESCRIPTION OF THE INVENTION

Figure 1:
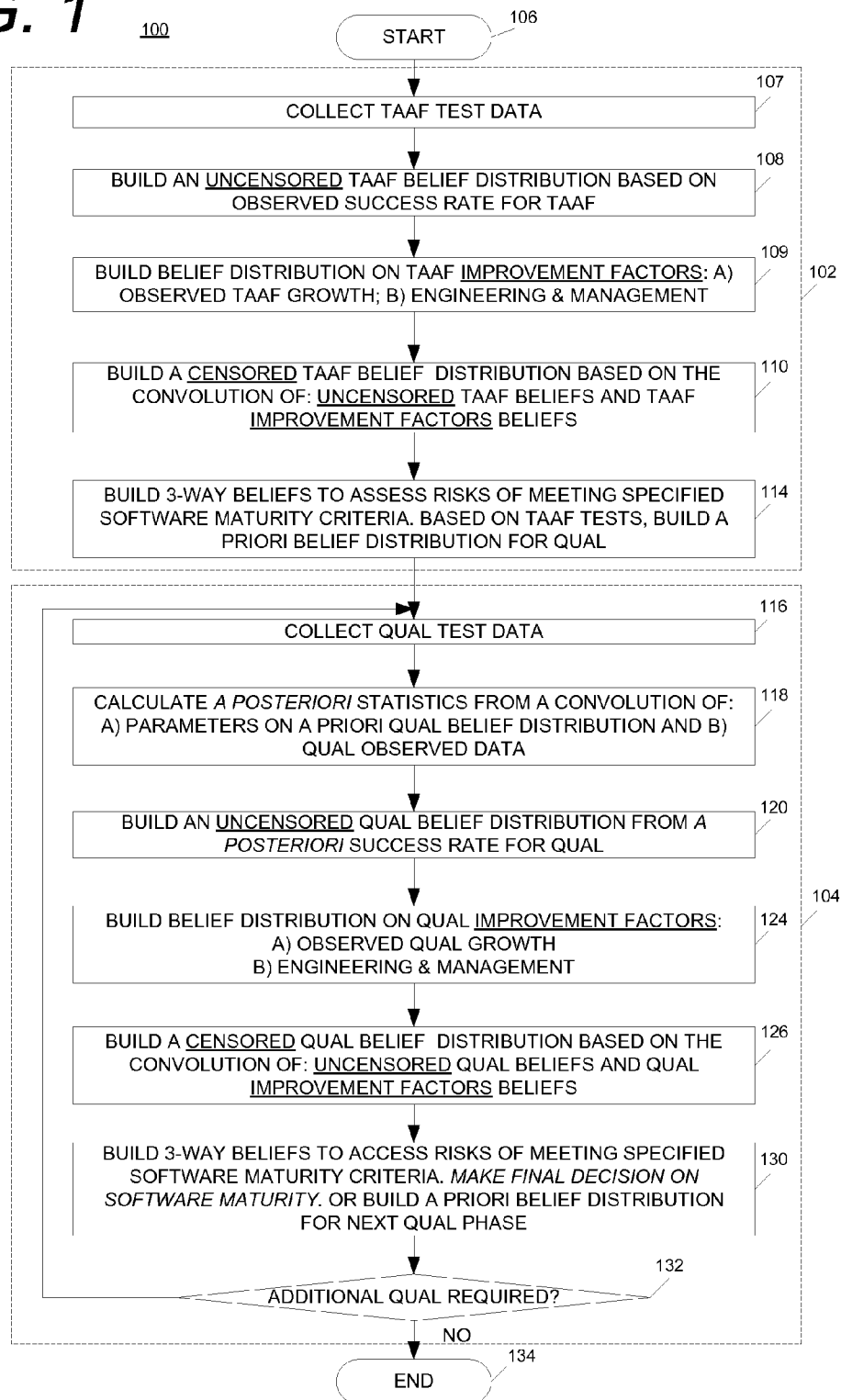
FIG. 1 is a flow diagram showing a method of determining software maturity according to the first embodiment of the invention.

FIG. 1 is a flow diagram illustrating a method 100 for determining software maturity according to an embodiment of the invention. The method comprises a TAAF (Test, Analyze, and Fix) phase 102 and a QUAL (formal Qualification) phase 104. TAAF phase 102 is the debug phase allowing the software to mature. But, it lacks the structure needed to perform rigorous mathematical analysis, such as stochastic modeling.

QUAL phase 104 comprises testing a specific release of software by which a set of criteria for establishing software maturity is developed. Software testing methodologies often incorporate multiple levels (e.g., modular, subsystem and system level) and the customer frequently dictates design and/or success criteria. Often, a design of experiments calls for a plurality of QUALs, sequentially occurring.

TAAF phase 102 begins at block 106 where the engineer establishes test plans and procedures including pass/fail criteria and what the nominal user inputs, off-nominal user inputs and the stress cases are to be. Phase 102 then proceeds to block 107 where a test engineer conducts the actual TAAF tests and makes a series of recorded experimental observations. These experimental observations result from software testing at discrete TAAF sub-stages in a software product development cycle. For example, such testing may be performed on alpha or beta versions of the software. Use-case tests, stress tests, or regression testing, or a combination thereof are employed.

As software development goes through several iterative TAAF testing sub-stages, an observed success rate for TAAF is assessed at each sub-stage. For method 100 (the first embodiment) the observed success rate is based nominal test cases only. The observed success rate for TAAF is a proportionality measurement of the number of successful or "passing" tests to the number of total nominal tests performed on the software. Using classical software testing methods, the observed success rate for TAAF may be defined as:

$$ObservedSuccessRateforTAAF = \frac{R}{N}$$

Wherein R is the number of successful nominal tests, and N is the number of total nominal tests.

Each sub-stage is associated with this proportionality, as shown by way of example in Table 1.

TABLE 1

TAAF test data (example).

| TAAF Sub-stage | Observed Success Rate for TAAF |
|---|---|
| I-2 | 0.3 |
| I-1 | 0.4 |
| I | 0.6 |

Sub-stages I-2, I-1, I are iterations in the testing during TAAF phase 102. Sub-stage I-2 is the first testing stage and Sub-stage I is the last testing stage. In between each sub-stage, Corrective Actions (CA's) are made to the software by software developers for fixing defects identified by the failed tests. Successful CA's should—but, not necessarily—yield an increasing observed rate of success for TAAF through each iterative sub-stage. Inasmuch as Table 1 shows three TAAF sub-stages, it should be appreciated that any number of sub-stages may be implemented. Generally, TAAF testing is considered complete once a predetermined observed success rate criterion has been met.

At block 108, assigning a belief to each observed success rate for TAAF creates the uncensored TAAF belief distribution. An example of such an assignment is shown in Table 2. The observed success rate is also an uncensored statistic. The uncensored belief distribution referred to henceforth is the belief assignment in the fashion of a belief distribution about this uncensored statistic.

TABLE 2

Uncensored TAAF Belief Distribution (example).

| TAAF Sub-stage | Observed Success Rate for TAAF | Beliefs Assigned |
|---|---|---|
| I-2 | 0.3 | 10% |
| I-1 | 0.4 | 30% |
| I | 0.6 | 60% |

The beliefs attest to the legitimacy, or how honest, true, or thorough one believes each sub-stage's observed success rate to be. In this example, a 60% belief assigned to sub-stage I testing (the most recent testing) indicates that one is putting the most belief into the most recent testing. A 10% belief assigned to sub-stage I-2 testing indicates that one is putting the least amount of belief into the earliest testing of TAAF phase 102. It is an older test and does not incorporate the more recent corrective actions.

The beliefs may be assigned in accordance with experience from extensive software testing from other projects, or may be a compromised distribution between the software developer and the user or client.

It should be noted that in an alternative embodiment, an additional observed success rate for TAAF may be fabricated, such as, for example, an observed success rate of 0.7, and a belief assigned thereto in order to "smooth out" the distribution about the TAAF sub-stages.

Still, alternative methods of smoothing out the distribution may be employed. Some such methods may be used when the growth of the observed success rate is not as conclusive as evidenced in the preceding example. In these situations, the observed success rate for TAAF of each subsequent sub-stage of testing may be too close to the observed success rate of the preceding sub-stage to be conclusive for belief assignments, or may be altogether irregular and completely inconclusive. For either situation, a calculated observed success rate for TAAF is established using a mean from the observed success rates. Next, an interval for the observed success rate around the mean (u) is established by:

$$u +/- 2 \times Interval \times \sqrt{u} \text{ where } Interval = \frac{1}{\sqrt{\sum_{i=1}^{n} N_i^2}}$$

wherein $N_i$ is the number of tests for each sub-stage i. Each calculated observed success rate for each TAAF sub-stage i is assigned a belief accordingly. It must be cautioned that in this first embodiment (method 100), only the nominal tests are used. (those tests that reflect how the user exercises the software say 80% of time) Off-nominal and stress tests (the majority of TAAF tests) are NOT used. The second embodiment (method 102) does however permit the use all tests including the regression tests used to verify the correction actions.

At block 109, we build a belief distribution for the improvements (growth) in software maturity during the TAAF phase. This invention proposes a combination of two approaches to obtain estimates for these improvements. The first is to directly measure the growth of the uncensored statistics for the various sub-phases of the TAAF Phase 102. An estimation technique such as Least Squares Estimator (LSE) or Maximum Likelihood Estimator (MLE) may be used to assess this growth statistic. In effect, the measurement of observed growth is an estimate as to the geometric slope of the uncensored TAAF distribution. The second approach is to use engineering and management evaluation of the various corrective actions (CAs). The best estimates for improvements factors (growth in maturity) is really the convolution of both the observed growth between TAAF stages of the observed success rate and the Management/Engineering beliefs. Example of this convolution is shown in Table 3.

TABLE 3

(example).

| Measurement of observed growth of uncensored TAAF distribution | Convoluted Improvement Factor Management/Engineering Team evaluations | | | | |
|---|---|---|---|---|---|
| | 0.3 | 0.5 | 0.7 | 0.9 | 1.0 |
| 0.3 | 0.3 | 0.3–0.5 | 0.3–0.5 | 0.3–0.5 | 0.3–0.5 |
| 0.5 | 0.3–0.5 | 0.5 | 0.5–0.7 | 0.5–0.7 | 0.5–0.7 |
| 0.7 | 0.3–0.5 | 0.5–0.7 | 0.7 | 0.7 | 0.7 |
| 0.9 | 0.3–0.5 | 0.5–0.7 | 0.7 | 0.7 | 0.7 |

The template provides upper and lower bounds for an improvement factor interval, or in some cases a mean for establishing bounds for improvement factors.

By way of example, and using the template of Table 3, if 0.3 was the observed growth of the uncensored TAAF distribution, and the management or engineering team evaluation is 0.7, indicating that they claim that 70% of all defects were solved by CA's, then an improvement factor interval with a lower bound of 0.3 and an upper bound of 0.5 is established. Once bounds have been established, the bounds are divided by intervals so that beliefs may be assigned to each. The beliefs attest to the legitimacy or how honest, true, or thorough one believes each improvement factor to be. In the example of Table 4, the test engineer has made a belief assignment on the overall convolution of observed growth and management/engineering evaluations on corrective actions. A belief assignment between a lower bound of 0.3 and an upper bound of 0.5, indicates that the test engineer is placing equal belief into each improvement factor. It should be appreciated that other beliefs may be assigned thereto to create a non-uniform distribution.

TABLE 4

Assigning Beliefs to the convoluted Improvement factors (from Table 3 example).

| Improvement Factor | Belief Assignment |
|---|---|
| 0.30 | 20% |
| 0.35 | 20% |
| 0.40 | 20% |
| 0.45 | 20% |
| 0.50 | 20% |

At block 110, the test engineer builds a censored TAAF belief distribution based on the uncensored TAAF belief distribution (from block 108) convoluted with the growth (improvement) beliefs (from block 109). Applying the combined improvement factors to the uncensored statistics (observed success rate) produces an estimate on software maturity as it should be seen during Qual or during the deployment of the software itself. This estimate on projected software maturity is a censored statistic. For example, say the improvement factor based on observation of growth and engineering/management judgment is 50%. Let the uncensored statistics (observed success rate) be R/N. That is, it is deemed that 50% of the failed tests could be brought to success by the proposed corrective actions then a good estimate of projected software maturity is: R/N +(1−(R/N)) *50%.

This convolution is two major but simple steps. The first step is to take the cross product—all combinations—of each observed success rate (uncensored statistic)—(see column 1 of Table 2) with each improvement factor (see column 1 of Table 4). The actual individual product is: uncensored statistic+(1−uncensored statistic)*Improvement Factor (Table 4). This cross product then becomes a vector of corresponding censored statistics. The second step is take the cross product—all combinations—of the beliefs associated with each observed success rate (see column 2 of Table 2) with the beliefs associated with each Improvement Factor (see column 2 of Table 4). This cross product then becomes a vector of corresponding beliefs about the censored statistics. Form a new vector ranking from lowest to highest values of censored statistics. Build, in a cumulative fashion, a cumulative belief distribution that corresponds to the new ranked vector. The resultant belief distribution then becomes the cumulative belief distribution, or simply the belief distribution, about the censored statistics associated with TAAF testing. More concisely, this is called a censored TAAF belief distribution and be called such henceforth.

At block 114, the censored TAAF belief distribution is translated into an a priori belief distribution for use as a starting point in the QUAL phase. In one embodiment, translation is accomplished by curve-fitting the censored TAAF belief distribution onto a probability function, for example, the Inverted Beta probability function, to derive a priori Beta parameters. In addition, 3-way assessments are made to ascertain the software maturity demonstrated so far. This helps with establishing the risks for the software meeting specified software maturity levels. An example of 3-way assessments is to find: 1) the software maturity corresponding to the 80% "confidence level" (cl.) or 20% risk of the uncensored belief distribution, 2) the corresponding 80% "confidence level" or 20% risk corresponding to the censored belief distribution and 3) a projection of the best estimate (e.g. 50% cl) from the uncensored belief distribution multiplied by best estimate for the observed growth during the last TAAF sub-stage. If both 2) and 3) meet the specified software maturity, and the user (customer) can live with 1) then the QUAL phase (Phase 104) may be cancelled especially if there are severe budget and schedule constraints. It must be cautioned that in this first embodiment (method 100), only the nominal tests are used (those tests that reflect how the user exercises the software say 80% of time. Off-nominal and stress tests (the majority of TAAF tests) are NOT used. The second embodiment (method 102) does however permit the use all tests include the regression tests used to verify the corrective actions.

QUAL software testing transpires at block 116, which represents the first step in QUAL phase 104.

At block 118, and in accordance with the present inventor's Bayesian design of experiments mathematics, QUAL a priori statistics from TAAF phase 102 are combined with observed QUAL experimentation data collected at block 116.

In order to combine these data sets, the statistics $R_{aposteriori}$ and $N_{aposteriori}$ are calculated. $R_{aposteriori}$ is the combination of: a) QUAL a priori statistic ($R_{prior}$) that is equivalent (from an Informational theoretical view) to the successful nominal tests from TAAF and b) the successful tests (R) from the QUAL tests themselves. $N_{aposteriori}$ is the combination of: a) QUAL a priori statistic ($N_{prior}$) that is equivalent (from an Informational theoretical view) to the total nominal tests from TAAF and b) the total nominal tests (N) from the QUAL tests themselves. $R_{aposteriori}$ and $N_{aposteriori}$ may be defined as:

$$R_{aposteriori} = R + R_{prior}$$

$$N_{aposteriori} = N + N_{prior}$$

wherein R is the number of observed successful tests from the current QUAL phase's experimentation, and N is the total number of observed tests from the current QUAL phase's experimentation. $R_{prior}$ and $N_{prior}$ may be defined as:

$$R_{prior} = \alpha$$

$$N_{prior} = \alpha + \beta$$

$\alpha$ is the alpha statistic from the a priori Beta distribution used as a curve-fit approximation to the censored TAAF belief distribution. $\beta$ is the beta statistic from the a priori Beta distribution used as a curve-fit approximation to the censored TAAF belief distribution. $\alpha$ and $\beta$ are obtained from (pessimistic, optimistic, mode) of the a priori Beta distribution of TAAF phase 2. Let, say, pessimistic=2% cl of belief function; optimistic=98% cl of belief function; mode =50% of same.

The a posteriori observed success rate for QUAL phase 104 may then be calculated as:

$$AposterioriObservedSuccessRateforQUAL = \frac{R_{aposteriori}}{N_{aposteriori}}$$

For purposes of explanation, a TAAF phase followed by a QUAL phase has been described herein. It should be appreciated that two iterative QUAL phases require the combination of the current QUAL phase test data and the previous QUAL phase $\alpha$ and $\beta$ statistics.

At block 120, a test design engineer uses this a posteriori success rate and statistics ($R_{aposteriori}$ and $N_{aposteriori}$) for QUAL to build an uncensored QUAL belief distribution. Similar to the algorithms employed at block 108, beliefs are assigned to the a posteriori observed success rate resulting from QUAL testing to form an uncensored QUAL belief distribution. As mentioned with respect to TAAF phase 102, additional observed success rates for QUAL may be fabricated in order to create a distribution around the calculated a posteriori observed success rate for QUAL or to "smooth" out the distribution.

At Block 124, a test engineer builds a belief distribution for the improvements in software maturity during the QUAL phase much in the same way he did for Block 109. These improvements are based on: a) a measurement of the observed growth of the uncensored statistics for the QUAL phase and b) engineering/management evaluation as to the effectiveness of the various corrective actions taken. For a) the uncensored statistics is simply the number of passes (failed) tests divided by the total number of individual tests (per user inputs) without accounting for the corrective actions taken. An estimation technique such as Least Squares Estimator (LSE) or Maximum Likelihood Estimator (MLE) may be used to assess this growth statistic. In effect, the measurement of observed growth is an estimate as to the geometric slope of the uncensored QUAL belief distribution. For b), the management or engineering team, or independent contractor, evaluates the various CAs as to their effectiveness in correcting the defects discovered during QUAL testing. With a) and b), a template similar to Table 3 may be consulted for providing upper and lower bounds for the improvement factors. Intervals are created within the bounds and a belief is assigned to each improvement factor.

At block 126, the test engineer builds a censored QUAL belief distribution based on the uncensored QUAL belief distribution (from block 120) convoluted with the growth (improvement) beliefs (from block 124). The improvement factors are what distinguish the censored QUAL belief distribution from the uncensored QUAL distribution of the previous step. Improvement factors are improvement expectation effectiveness due to the CA's being taken. The whole method in block 126 parallels that of block 110 for the TAAF tests.

At block 130, the censored QUAL belief distribution is translated into an a priori distribution for the next QUAL if it is determined that one is needed. In one embodiment, translation is accomplished by curve-fitting the joint QUAL belief distribution onto a probability function, for example, the Inverted Beta probability distribution function to derive an a priori Beta distribution function. Also, a 3-way assessment in the same manner as described in block 114 is performed.

At block 132, a decision based on the 3-way assessment of Block 130 is made. See paragraph [0024] for a discussion on this 3-way assessment for TAAF tests since it is much the same decision making involved. The a priori Beta distribution function is evaluated at chosen confidence intervals to measure a level of maturity of the software. This function evaluated at higher confidence levels represents an optimistic view while this function evaluated at lower confidence levels represents a pessimistic view. A variety of statistical tests may be used for evaluating the level of maturity of the software. One such example is a one-tailed statistical test. If a one-tailed test is used, the null hypothesis is set to a minimum threshold level of software maturity. The QUAL maturity threshold may be a maturity criteria set by the client. If the evaluation exceeds this threshold, then the null hypothesis is accepted and the software is deemed acceptable. If no additional QUALS are to be performed, the iterations are halted at block 134. If, however, the test does not exceed this threshold, the null hypothesis is rejected and further QUAL testing is required and control flow proceeds to block 116.

While the embodiment of FIG. 1 uses a Bayesian Belief Network model to determine the maturity of software in development, only the test statistics: the number of success (fails) and the total number of nominal tests are measured. The tests chosen are from the user distributions and reflect generally 80% of the time how the software really will be used; these tests are deemed "nominal". These tests provide for the uncensored estimates baseline. To obtain the censored estimates; then, in addition, the total CAs and their effectiveness are evaluated as well as any geometric measured growth. In another embodiment, the present inventor's Bayesian Information Science (BIS) theories are incorporated permitting the use of those tests reflecting the other 20% of time where the software is used (off-nominal and maybe even stressed). In addition, any regression testing to verify corrective actions (CA) can be used to build the uncensored and censored Belief distributions. In very few words, BIS allows the additional off-nominal and stress tests themselves to the nominal tests to increase confidence levels of any statistics and how much total testing is needed.

Figure 2:
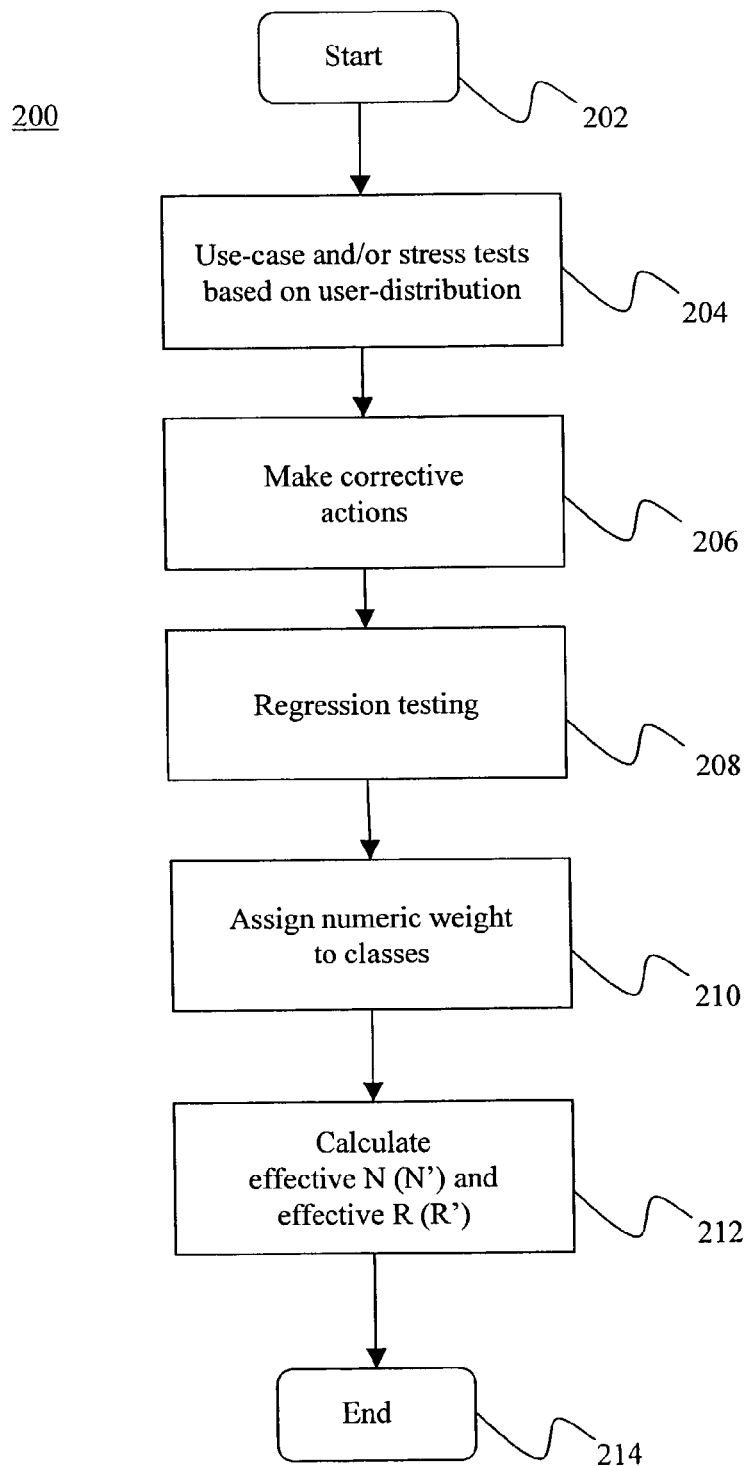
FIG. 2 is a flow diagram showing a method of software testing according to the second embodiment of the invention; and, FIG. 3 is a block diagram of a computer system for implementing and executing the method according to one embodiment of the invention.

FIG. 2 illustrates a method 200 for using Bayesian Information Science (BIS) as part of the Bayesian Belief Networks (BBN) design of experiments presented in method 100. The Bayesian design of experiments process starts at block 202 and proceeds to block 204, at which use-case tests and/or stress tests are performed on the software. Use-case tests are those tests designed to test software under normal-use conditions. Stress tests are those tests including off-nominal cases to test the level of robustness of the software. Stress tests are often designed to try to "break" the software and are more rigorous and thorough in nature.

The use-case tests and/or stress tests are assigned to a test class type depending on their level of severity. The number and the definition of severity for each class may be determined based on the type of software or testing that is being performed. In one embodiment, use-case tests and/or stress tests may be divided into four classes. Class 1 comprises tests with simple, single inputs. Class 2 comprises tests with complex inputs. Class 3 comprises tests with compound inputs. Class 4 comprises tests with compound and complex inputs.

In accordance with the class definitions of the present embodiment described, the percentage of defects in the software is often higher with Classes 3 and 4. For example, although only twenty percent of use-distribution may be distributed across Classes 3 and 4, the percentage of identified defects may be as high as ninety percent in Classes 3 and 4, whereas Classes 1 and 2 would comprise ten percent of the defects identified in the software. This is because Classes 3 and 4 comprise compound and/or complex inputs, which are subject to more software defects.

Once the use-case tests and/or stress tests have identified defects in the software at block 204, CA's are employed to fix the defects at block 206. This may involve rewriting some of the existing software or adding new software code. The number or extent of CA's depends from the number or severity of the defect.

The CA's are subjected to regression testing at block 208. Regression testing comprises tests that aim to verify the success or failure of the CA's. Therefore, the depth and breadth of regression testing is dependent on the number of previously failed use-case tests and/or stress tests. Because the failed use-case tests and/or stress tests generally will be most prevalent in test classes comprising compound and/or complex inputs, the depth and breadth of regression testing generally will be most prevalent in these test classes as well. In the present embodiment, depth and breadth of regression testing may be most prevalent in Classes 3 and 4.

Because regression testing verifies the success or failure of CA's, the tests are concentrated on certain problem areas. As a result, there is an effective increase in the testing sample size that would normally be unattainable by using classical models.

At the completion of regression testing, linear or geometric weights are assigned to the test classes at block 210. Weights assigned linearly provide equal bearing to each of the test classes by assigning a weight of 1 to each class. For example, Classes 1 through 4 may have linear weights L defined as:

$$L=\{1.0, 1.0, 1.0, 1.0\}$$

Geometrically defined weights provide a degree of influence relative to each class. For example, Classes 1 through 4 may be have geometric weights G defined as:

$$G=\{2.0, 4.0, 8.0, 16.0\}$$

Geometric weights determine the degree to which each class's tests will bear on the overall test data. In general, the more depth and breadth of regression testing a test class comprises, the larger the geometric weight assigned to that test class.

The effective sample size (the effective total number of tests) is calculated at block 212. Because of the introduction of regression testing and geometric weights, the effective sample size is greater than the actual sample size (the actual total number of tests). The effective sample size N' may be defined as:

$$N' = \sum_{i=1}^{n} (N_i + D_i * CA_i * G_i)$$

This formula also applies for Linear weights as well—just substitute Li for Gi.

wherein i is a test class, n is the number of test classes i, $N_i$ is the number of use-case tests and/or stress tests for class i, $D_i$ is the number of defects for class i (i.e. the number of failed use-case tests and/or stress tests), $CA_i$ is the probability of failed use-case tests and/or stress tests that have been corrected and verified via regression testing for class i, and $G_i$ is the geometric weight assigned to class i.

The effective number of successful tests (the number of passing tests as a result of corrective actions, regression testing, and geometric weights) is also calculated at block 212. The effective number of successful tests R' may be defined as:

$$R'=\{\Sigma Ri/\Sigma Ni\}*N'$$

This formula also applies for Linear weights as well-just substitute Li for Gi.

wherein i is a test class, $R_i$ is the number of successful use-case and/or stress tests for class i, $N_i$ is the number of use-case tests and/or stress tests for class i, and N' is the effective sample size.

The effective observed TAAF success rate may then be calculated as:

$$EffectiveObservedSuccessRateforTAAF = \frac{R'}{N'}$$

Method 200 ends at block 214.

In one embodiment, the effective observed success rate for TAAF may substitute for the observed success rate for TAAF of method 100 in FIG. 1. However, this embodiment requires an additional step between block 116 and block 118 and a modification to the $R_{aposteriori}$ and $N_{aposteriori}$ statistics at block 118.

Referring to FIG. 1, the a priori belief distribution may require a shift relative to the mean so that it may be combined with observed test data of the current QUAL phase at block 118. The shift is dependent on the current QUAL phase testing environment and success results obtained at block 116. For example, if it is seen that the test results have improved over the previous TAAF or QUAL phase, then one needs to shift the a priori belief distribution upward. In this manner, for example, if an a priori Inverted Beta distribution function for the software maturity after TAAF is completed has a value of 0.76 at, say, 60% confidence level, an upward shift in the distribution would be necessary if the current QUAL test data has an observed success rate of 0.80. This may be the case if little or no changes in the software were made between the TAAF phase and QUAL phase or between two iterative QUAL phases. Likewise, if there have been lots of software changes, one may be required to shift the distribution downward. In the above example, the magnitude k would be a shift of 0.80/0.76.

At block 118, the a priori belief distribution is shifted using modified $R_{aposteriori}$ and $N_{aposteriori}$ statistics defined as:

$$R_{aposteriori}=R+k*R_{prior}$$

$$N_{aposteriori}=N+N_{prior}$$

An inverse beta function may then be run on $R_{aposteriori}$ and $N_{aposteriori}$ to derive an a posteriori observed success rate for QUAL at a predetermined confidence intervals. Beliefs may be assigned to the a posteriori observed success rate for QUAL in accordance with block 120 of FIG. 1, and proceed therefrom.

Figure 3:
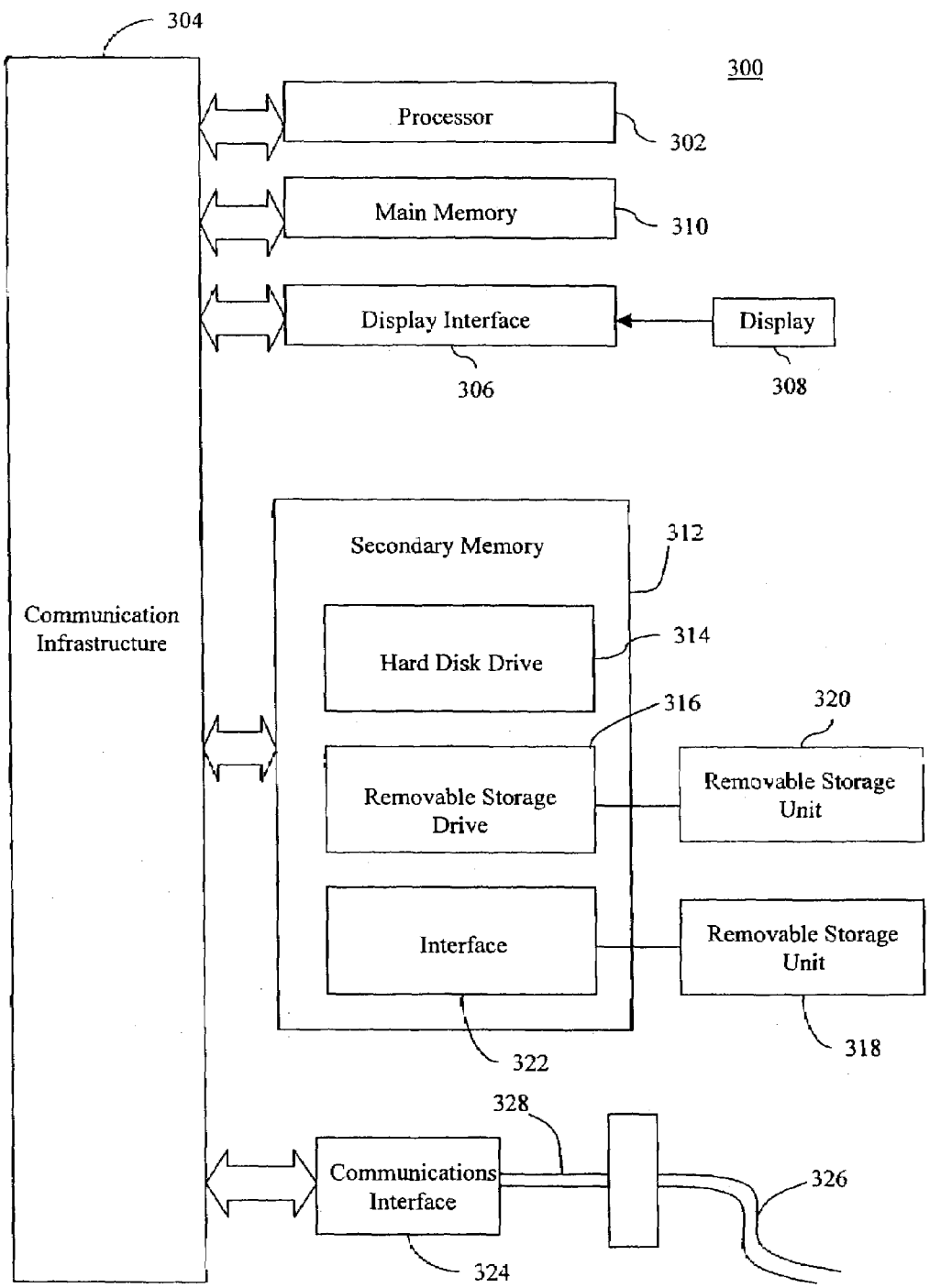

The present invention may be implemented using hardware, software or a combination thereof and may be implemented in one or more computer systems or other processing systems. In fact, in one embodiment, the invention is directed toward one or more computer systems capable of carrying out the functionality described herein. An example of a computer system 300 is shown in FIG. 3. Computer system 300 includes one or more processors, such as processor 302. Processor 302 is connected to a communication infrastructure 304 (e.g., a communications bus, cross-over bar, or network). Various software embodiments are described in terms of this exemplary computer system. After reading this description, it will become apparent to a person skilled in the relevant art(s) how to implement the invention using other computer systems and/or computer architectures.

Computer system 300 can include a display interface 306 that forwards graphics, text, and other data from communication infrastructure 304 (or from a frame buffer not shown) for display on a display unit 308.

Computer system 300 also includes a main memory 310, preferably random access memory (RAM), and may also include a secondary memory 312. Secondary memory 312 may include, for example, a hard disk drive 314 and/or a removable storage drive 320, representing a floppy disk drive, a magnetic tape drive, an optical disk drive, etc. Removable storage drive 316 reads from and/or writes to a removable storage unit 320 in a well-known manner. Removable storage unit 320, represents a floppy disk, magnetic tape, optical disk, etc. which is read by and written to by removable storage drive 316. As will be appreciated, removable storage unit 320 includes a computer usable storage medium having stored therein computer software and/or data.

In alternative embodiments, secondary memory 312 may include other similar means for allowing computer programs or other instructions to be loaded into computer system 300. Such means may include, for example, a removable storage unit 318 and an interface 322. Examples of such may include a program cartridge and cartridge interface (such as that found in video game devices), a removable memory chip (such as an EPROM, or PROM) and associated socket, and other removable storage units 318 and interfaces 322 which allow software and data to be transferred from removable storage unit 318 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a PCMCIA slot and card, etc. Software and data transferred via communications interface 324 are in the form of signals 328 which may be electronic, electromagnetic, optical or other signals capable of being received by communications interface 324. These signals 328 are provided to communications interface 324 via a communications path (i.e., channel) 326. This channel 326 carries signals 328 and may be implemented using wire or cable, fiber optics, a phone line, a cellular phone link, an RF link and other communications channels.

In this document, the terms "computer program medium" and "computer usable medium" are used to generally refer to media such as removable storage drive 316, a hard disk installed in hard disk drive 314, and signals 328. These computer program products are means for providing software to computer system 300. The invention is directed to such computer program products.

Computer programs (also called computer control logic) are stored in main memory 10 and/or secondary memory 312. Computer programs may also be received via communications interface 324. Such computer programs, when executed, enable computer system 300 to perform the features of the present invention as discussed herein. In particular, the computer programs, when executed, enable processor 302 to perform the features of the present invention. Accordingly, such computer programs represent controllers of computer system 300.

In an embodiment where the invention is implemented using software, the software may be stored in a computer program product and loaded into a computer system 300 using removable storage drive 316, hard drive 314 or communications interface 324. The control logic (software), when executed by processor 302, causes processor 302 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

It should be appreciated that a computer readable medium or computer system may implement a method for managing the Bayesian design of experiments process as disclosed herein.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method for testing software comprising the steps of:
    performing use-case or stress testing on the software based on a user-distribution, the use-case testing comprising a plurality of use-case tests and the stress testing comprising a plurality of stress tests;
    making corrective actions to the software in response to failed tests of the use-case or stress testing;
    performing regression testing to verify the success or failure of the corrective actions, wherein the depth and breadth of regression testing is dependent on the number of previously failed use-case tests and/or stress tests; and
    calculating an effective observed success rate of the use-case testing or stress testing and regression testing.

2. The method of claim 1, further comprising the steps of:
    assigning each use-case test or stress test and regression test to a test class type based on a level of severity of the respective test;
    assigning a weight to each class type; and
    wherein the effective observed success rate is calculated from the number of successful use-case tests or stress tests, the number of failed use-case tests or stress tests, the number of corrective actions, and the weight assigned to each class type.

* * * * *